(12) United States Patent
Tsai

(10) Patent No.: US 8,944,442 B2
(45) Date of Patent: Feb. 3, 2015

(54) SHRINKABLE LOAD SUPPORTER OF A PUSHCART

(71) Applicant: Hai-Ming Tsai, Tainan (TW)

(72) Inventor: Hai-Ming Tsai, Tainan (TW)

(*) Notice: Subject to any disclaimer, the term of this patent is extended or adjusted under 35 U.S.C. 154(b) by 0 days.

(21) Appl. No.: 13/987,775

(22) Filed: Sep. 3, 2013

(65) Prior Publication Data

US 2014/0103615 A1    Apr. 17, 2014

(30) Foreign Application Priority Data

Oct. 12, 2012   (TW) .............................. 101137881 A

(51) Int. Cl.
*B62B 3/02*    (2006.01)

(52) U.S. Cl.
CPC ..................................... *B62B 3/02* (2013.01)
USPC .. 280/35; 280/47.18; 280/47.27; 280/47.315; 280/655

(58) Field of Classification Search
None
See application file for complete search history.

(56) References Cited

U.S. PATENT DOCUMENTS

| | | | | |
|---|---|---|---|---|
| 1,419,160 A * | 6/1922 | McKinnon | .................... | 280/638 |
| 2,718,404 A * | 9/1955 | Burskey | ........................ | 280/659 |
| 3,104,890 A * | 9/1963 | Hill | .............................. | 280/659 |
| 5,228,716 A * | 7/1993 | Dahl | ............................. | 280/651 |
| 5,249,823 A * | 10/1993 | McCoy et al. | ................ | 280/656 |
| 6,036,219 A * | 3/2000 | Oefelein et al. | ............. | 280/638 |

* cited by examiner

*Primary Examiner* — J. Allen Shriver, II
*Assistant Examiner* — Hilary L Johns

(57)    ABSTRACT

A shrinkable load supporter of a truck includes a telescopic pole set having two end respectively combined with a front base and a rear base and threadably fixed with positioning tubes. Fixed over grooves of the front base and the rear base respectively is a pressing rod, which presses on outer tubes and inner tubes of the telescopic pole set. The pressing rod is provided with plural through holes corresponding to threaded holes of the front base and said rear base. With screws threadably fixed in said through holes of the pressing rod and the threaded holes of the front base and the rear base, the telescopic pole set can thus be firmly combined together with the front base and the rear base.

2 Claims, 4 Drawing Sheets

SHRINKABLE LOAD SUPPORTER OF A PUSHCART

BACKGROUND OF THE INVENTION

1. Field of the Invention

This invention relates to a shrinkable load supporter of a pushcart, particularly to one provided with pressing rods to make the load supporter stably usable and convenient to be expanded and shrunk, and wheel fixing portions to make wheels easy to be assembled or disassembled.

2. Description of the Prior Art

As shown in FIG. 1, a conventional pushcart has a load supporter 1 composed of a front base 10, a rear base 11 and a telescopic pole set 12. With the telescopic pole set 12 extended, the load supporter 1 can be loaded with a larger or more goods. However, as the telescopic pole set 12 has only one side fixed with the front base 10 and the rear base 11, it may get loosened with the front base 10 and the rear base 11 while being heavily loaded with goods, which are possible to be damaged. Moreover, as the wheels (A) are directly fixed with the load supporter 1, they can't be replaced by a user in case of being broken and to be sent to a factory for repair.

SUMMARY OF THE INVENTION

The object of this invention is to offer a shrinkable load supporter of a pushcart.

The main characteristic of the invention is two pressing rods respectively fixed over a front base and a rear base to press on outer tubes and inner tubes. The pressing rod is provided with plural through holes corresponding to threaded holes of the front base and the rear base.

BRIEF DESCRIPTION OF DRAWINGS

This invention is better understood by referring to the accompanying drawings, wherein.

DETAILED DESCRIPTION OF THE PREFERRED EMBODIMENT

Figure 1:
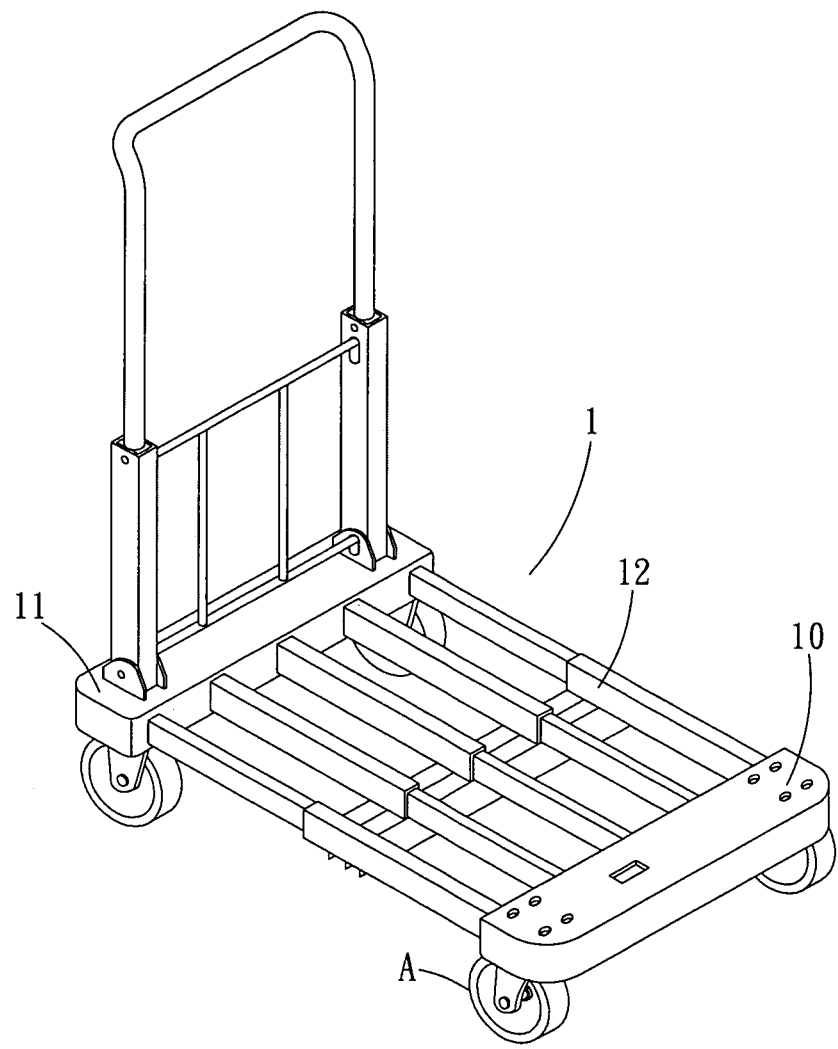
FIG. 1 is a perspective view of a conventional pushcart.
Figure 2:
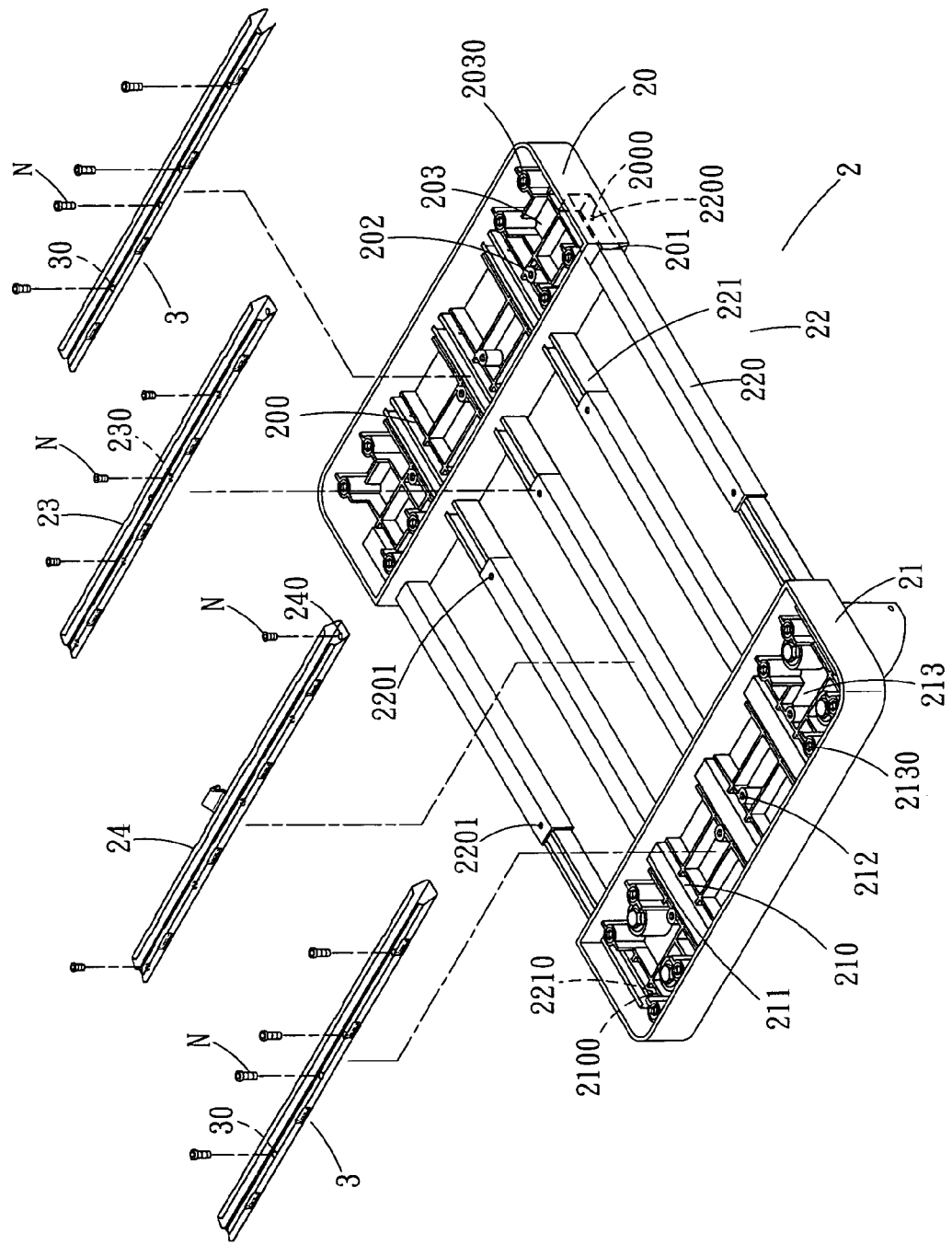
FIG. 2 is an exploded perspective view of a preferred embodiment of a shrinkable load supporter of a pushcart in the present invention.
Figure 3:
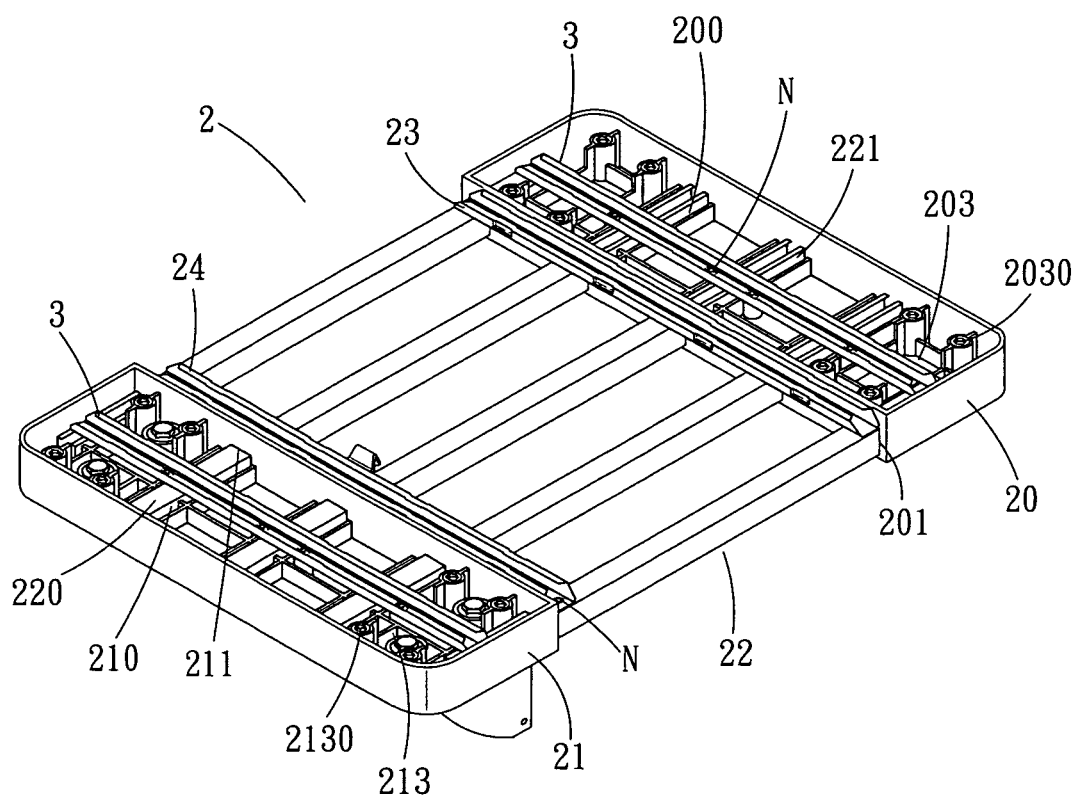
FIG. 3 is a perspective view of the preferred embodiment of a shrinkable load supporter of a push-truck in the present invention.
Figure 4:
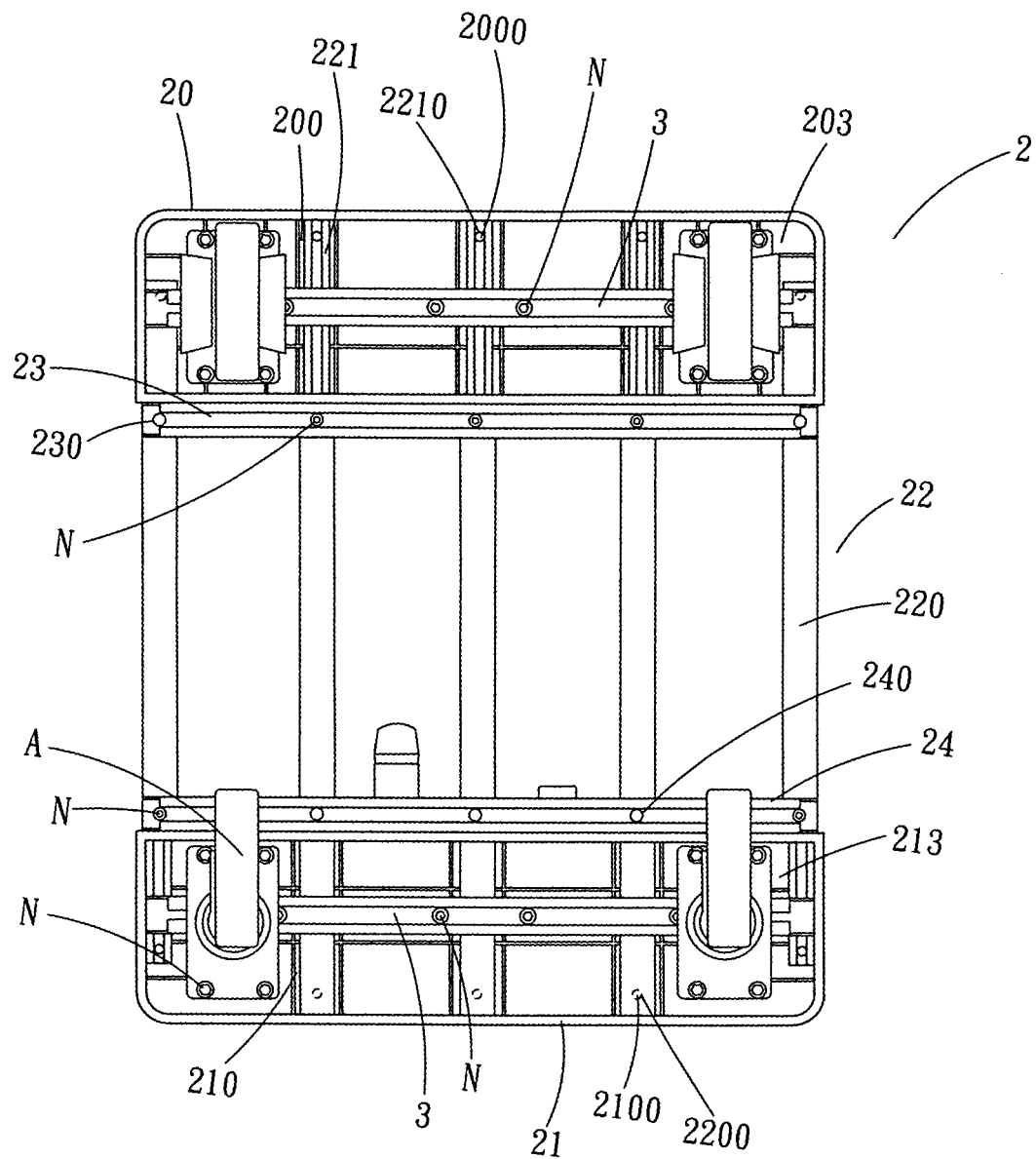
FIG. 4 is a top view of the preferred embodiment of a shrinkable load supporter of a pushcart in the present invention, showing it being assembled with wheels.

As shown in FIGS. 2~4, a preferred embodiment of a load supporter 2 of a pushcart in the present invention includes a front base 20, a rear base 21, a telescopic pole set 22, two positioning tubes 23 and 24, and two pressing rods 3.

Both of the front base 20 and the rear base 21 are respectively provided with plural grooves 200 and 210 corresponding to each other, and plural through holes 201 and 211 corresponding to each other. Each of the grooves 200 and 210 is provided with a projection 2000 and 2100, and a threaded hole 202 and 212 located outwardly at a proper position. Further, each of the front base 20 and the rear base 21 is also provided with a wheel fixing portion 203 and 213 formed at two sides of the bottom respectively, with a plurality of threaded holes 2030 and 2130 bored in each of the wheel fixing portion 203 and 213.

The telescopic pole set 22 is installed between the front base 20 and the rear base 21, including five telescopic poles respectively provided with an outer tube 220 inserted with an inner tube 221. Each outer tube 220 is provided with an interlocking hole 2200 and a positioning hole 2201. Each inner tube 221 is provided with an interlocking hole 2210. The two telescopic poles fixed outwardly at two sides have one end of the inner tubes 221 inserted through the through holes 211 of the rear base 21, fitted in the grooves 210 and interlocked with the projections 2100 successively, and one end of the outer tubes 220 inserted through the through holes 201 of the front base 20, fitted in the grooves 200 and interlocked with the projections 2000 successively. The other three telescopic poles have one end of the inner tubes 221 inserted through the through holes 201 of the front base 20 and fitted in the grooves 200 with the interlocking holes 2200 locked with the projections 2000, and one end of the outer tubes 220 inserted through the through holes 211 of the rear base 21 and fitted in the grooves 210 with the interlocking holes 2210 locked with the projections 2100.

The positioning tubes 23 and 24 are respectively provided with plural combining hole 230 and 240 employed for being screwed together with the positioning holes 2201 of the outer tubes 220 to make the outer tubes 220 and the inner tubes 221 unable to separate from each other.

The pressing rods 3 are fixed on the grooves 200 and 210 to press on the outer tubes 220 and the inner tubes 221, provided with plural through holes 30 corresponding to the threaded holes 202 and 212 of the front base 20 and rear base 21.

In assembling, the two outer tubes 220 and the three inner tubes 221 arrayed between the two outer tubes 220 are first inserted through the through holes 201 and the grooves 200 of the front base 20, with the interlocking holes 2200 and 2210 locked with the projections 2000 and 2100. One pressing rod 3 is vertically pressed on the outer tubes 220 and the inner tubes 221, with screws (N) inserted through the through holes 30 to threadably fix with the threaded holes 202. Then, the two inner tubes 221 and the three outer tubes 220 arrayed between the two inner tubes 221 are inserted through the through holes 211 and the grooves 210 of the rear base 21, with the interlocking holes 2200 and 2210 locked with the projections 2000 and 2100. The other pressing rod 3 is vertically pressed on the outer tubes 220 and the inner tubes 221, with screws (N) inserted through the through holes 30 to threadably engage with the threaded holes 212. Finally, the front base 20 and the rear base 21 are jointed with each other, with the combining holes 230 and 240 of the positioning tubes 23 and 24 and the positioning holes 2201 of the outer tubes 220 fixed together by screws (N). Thus the shrinkable load supporter of the invention is firmly finished.

Furthermore, with screws (N) screwed through the threaded holes 2030 and 2130 of the wheel fixing portions 203 and 213 and the combining holes of the wheels (A), the wheels (A) can be easily assembled with or disassembled from the shrinkable load supporter of the pushcart.

The invention has the following advantages as can be seen from the foresaid description.

1. A user can easily assemble or disassemble wheels because of the wheel fixing portions 203 and 213.

2. With the pressing rods 3 fixed on the outer tubes 220 and the inner tubes 221, the combination of the load supporter of the invention is much more strengthened.

While the preferred embodiment of the invention has been described above, it will be recognized and understood that various modifications may be made therein and the appended claims are intended to cover all such modifications that may fall within the spirit and scope of the invention.

What is claimed is:

1. A shrinkable load supporter of a pushcart, said shrinkable load supporter comprising:
a front base and a rear base respectively provided with plural through holes and grooves corresponding to each other, a threaded hole located outside each said groove at a proper position;
a telescopic pole set installed in said through holes of said front base and said rear base and including plural outer tubes and plural inner tubes correspondingly inserted in said outer tubes, each said inner tube having one end inserted through said through hole and fitted and positioned in said groove, each said outer tube having one end inserted through said through hole and fitted in said groove and another end bored with a positioning tube; and
a pressing rod provided on said front base and said rear base respectively to press on said outer tubes and said inner tubes, said pressing rod provided with plural through holes corresponding to said threaded holes of said front base and said rear base so that screws can be inserted through said through holes of said pressing rods to threadably engage with said threaded holes to make said load supporter firmly assembled.

2. A shrinkable load supporter of a pushcart, said shrinkable load supporter comprising:
a front base and a rear base and a telescopic pole set and a tube-positioning member;
wherein said telescopic pole set comprises a plurality of telescoping poles installed between the front base and the rear base;
a pressing rod provided on said front base and said rear base respectively to press on ends of said telescoping poles; and
wherein said front base and said rear base are respectively provided with two wheel fixing portions located at two sides with plural threaded holes so that wheels can be easily assembled with or disassembled from said load supporter by users.

* * * * *